June 30, 1953 P. SPENCE Re. 23,675
PILOT-OPERATED VALVE
Original Filed Oct. 11, 1946
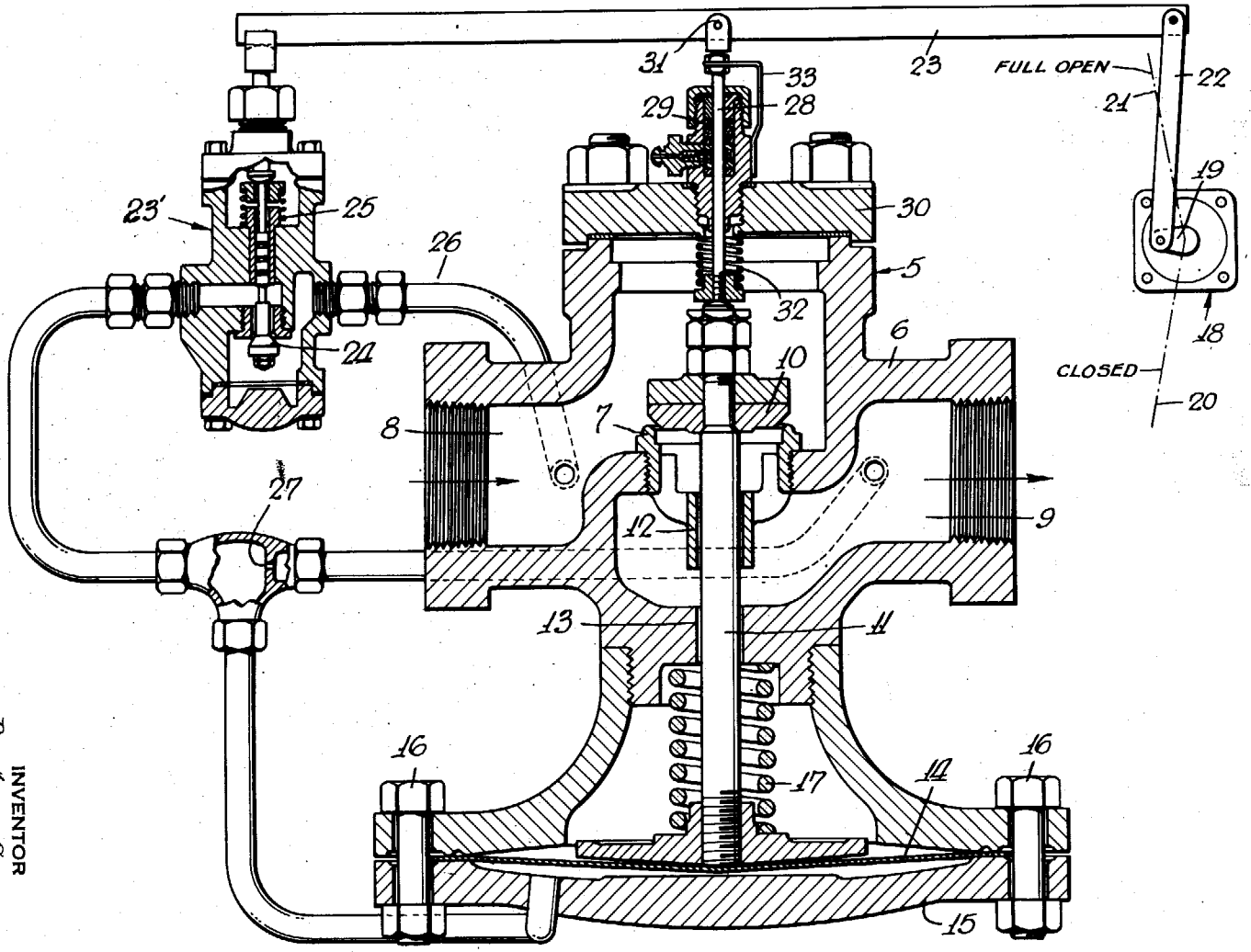
INVENTOR
Paulsen Spence
BY
Mitchell Bubert
ATTORNEYS Reissued June 30, 1953

Re. 23,675

UNITED STATES PATENT OFFICE 23,675

PILOT-OPERATED VALVE

Paulsen Spence, Baton Rouge, La., assignor to Spence Engineering Company, Inc., Walden, N. Y., a corporation of New York Original No. 2,611,218, dated September 23, 1952, Serial No. 702,813, October 11, 1946. Application for reissue December 9, 1952, Serial No. 325,047

2 Claims. (Cl. 50—11)

Matter enclosed in heavy brackets [ ] appears in the original patent but forms no part of this reissue specification; matter printed in italics indicates the additions made by reissue.

My invention relates to regulating devices, and in particular to a regulating valve and means for controlling the setting thereof.

It is an object of my invention to provide an improved automatic regulating device of the character indicated.

It is another object to provide an improved regulator which may utilize essentially standard component parts and which need not be subject to "hunting" or unstable operation.

Specifically, it is an object to provide an improved valve-regulating mechanism that will respond to orders from an externally located motor-positioner to maintain a regulated flow or pressure of fluid.

Other objects and various further features of the invention will hereinafter be pointed out or will occur to those skilled in the art from a reading of the following specification in conjunction with the accompanying drawing, which is a partly schematic sectional view illustrating preferred forms of my invention.

Broadly speaking, my invention contemplates a regulator comprising a first or main valve cooperating with a second or pilot valve by means of a rigid-body member directly associated with actuating elements of these valves and with an adjustable fulcrum. The first or main valve also includes pressure-responsive means for actuating the same in response to fluid pressures in the second valve. The arrangement is such that the main valve will tend to maintain a given flow rate or pressure for a given setting of the fulcrum.

In the specific form to be described, the pilot-valve inlet is supplied with pressure-fluid from the main-valve inlet, and connection of the rigid-body member to the two valve actuators is direct and such that an opening of one valve is accompanied by a closing of the other, and vice versa. A bleed connection is provided between the pilot-valve outlet and the main-valve outlet.

Referring to the drawing, my invention is shown in application to a first or main valve 5 having a valve body 6 with a seat 7, centrally located to define an inlet chamber 8 and an outlet chamber 9. A valve member or disc 10 cooperates with the seat 7 to control the rate of flow of a pressurized fluid from the inlet 8 to the outlet 9. The disc 10 may be carried by a stem 11 supported by suitable guide elements 12—13 and connected to pressure-responsive actuator means. In the form shown, the pressure-responsive means includes a diaphragm 14 capped by a hood member 15, which in turn may be secured to the valve body 6 as by means of a circumferential seal and by bolts 16. Resilient means such as a coil spring 17 normally urges the valve 5 to a closed position. The parts which have thus far been described are well known in the art and, therefore, form no part of my invention.

In accordance with the invention, means are provided to position the valve disc 10 with respect to its seat 7 so as to maintain a regulated flow or pressure in accordance with a given command or setting. In the present example, this command is provided by a conventional electric motor-positioner 18 which furnishes orders in the form of angular positions of a crank 19 between limits 20 and 21, representing "closed" and "full-open" settings of the valve 5. To effect this control the crank 19 may be linked as by a member 22 to a rigid-body or lever 23, which in turn may be directly associated with the actuating mechanism for the valve 5 and with the actuating mechanism for the pilot valve 23'. The connections to lever 23 are such that the crank 19 provides an adjustable fulcrum defining the nature of the cooperation between the two valves 5 and 23'. For a given setting of the crank 19 a transient motion of the valve disc 10 will be accompanied by a controlled supply of pressure fluid from the pilot valve 23' to the pressure-responsive actuating means of valve 5, and this change in control pressure tends to offset the effect of the transient motion by applying a repositioning or balancing force to the valve disc 10. This tendency of the valve to balance holds for any position of the crank 19, the only difference being that the balanced location of the valve disc 10 with respect to the seat 7 will depend upon the "commanding" position of the crank 19.

In the form shown, the disc 24 of the pilot valve 23' is normally resiliently urged to a seated or closed position by resilient means such as a coil spring 25. Inlet pressure to the pilot valve 23' is supplied through a pipe 26 which is tapped preferably to the inlet or upstream side of the valve 5. Controlled or outlet pressures from the pilot valve 23' are supplied directly to the pressure-responsive chamber defined by the hood 15 and the diaphragm 14, and a bleed 27 is provided from this connection to the downstream or outlet side 9 of the valve 5. Direct mechanical association between the rigid lever 23 and the actuating mechanism of valve 5 may be provided by a follower or position-indicator-rod 28, suitably bushed as at 29 to a cap 30 on the valve body 6 and pivotally linked as at 31 to the lever 23. If desired, resilient means such as a coil spring 32 may be employed constantly to urge the follower-rod 28 into abutment with an end of the stem 11 of the actuating mechanism for valve 5. Also, if desired, an indicator-pointer 33 may be adjustably secured to the follower 28 to display outside the valve 5 indications of the actual position of the valve member 10.

Assuming a substantially constant pressure at the inlet 8 of the valve 5, operation of my flow-regulating mechanism is substantially as follows. Let us say that equilibrium conditions obtain for the half-way positioning shown for crank 19 and for the discs 10 and 24 of the valves 5 and 23', and that the motor 18 now calls for a reduced flow. This order will be transmitted by a downward swing of crank 19, causing the lever 23 first to rock about the pivotal support 31 as an instantaneous fulcrum, thereby permitting the valve disc 24 to approach its seat under the action of the resilient means 25. This partial closure of the valve 23' results in reduced outlet flow from the pilot valve 23', with resultant reduction in pressure over the diaphragm 14. Action of the spring 17 then prevails to effect a downward displacement of the valve stem 11 and of the disc 10 that it carries. Flow from the inlet 8 to the outlet 9 is immediately reduced and the lever 23 caused to rock again, but this time the rocking action is about its connection with the link 22 as a fulcrum. This motion of the lever 23 slightly reopens the valve 23', and is followed by a correspondingly slight reopening of the valve disc 10, so as more nearly to approximate the flow rate ordered by the positioner-motor 18. Theoretically, this process of successively approximating the required position of the valve disc 10 might continue indefinitely, but as a practical method the bleed connection 27 provides a smoothing effect so as to reduce "hunting" between the valves.

Now, let it be assumed that there is a change in pressure at the inlet to the valve 5. If this change is a drop, reduced pressure will be available under the diaphragm 14, the valve disc 10 will tend to close, and resultant actuation of lever 23 will further open the pilot valve 23' so as to provide restoring pressure under the diaphragm 14. Due to reduced inlet pressure, the valve 5 will then be passing the required flow through a greater opening, as will be understood. In any case, whether the supply pressure is increased or decreased, it is clear that the cooperative relation between valves 5 and 23' will be such as to position the valve disc 10 for a regulated flow which reflects the instantaneous orders given by the crank 19 of the positioner-motor 18.

It will be seen that I have provided a relatively simple and improved automatic regulating device which may utilize essentially standard components to effect flow regulation. Within limits of pressure-fluid supply potential, the device will tend to hold a preselected or ordered constant rate of flow or pressure, and the system need not be subject to hunting.

While I have described my invention in detail for the preferred form shown, it will be understood that modifications may be made within the scope of the invention as defined by the claims which follow.

I claim:

1. In a regulating valve, a main valve including a body having a high-pressure side and a low-pressure side, a main-valve member for controlling the flow of pressure fluid from the high-pressure side to the low-pressure side, a fluid-pressure-actuated member for actuating said valve member and having a high-pressure side and a low-pressure side, means including a pilot-valve member for conducting high-pressure fluid from the high-pressure side of said main valve to the high-pressure side of said fluid-pressure actuated member, bleed means for exhausting the high-pressure side of said fluid-pressure-actuated member, a fulcrum adjustably positionable relatively to said valve body, selective positive positioning means for positioning said fulcrum in a selected desired position, a lever directly connected to said fulcrum, a first connecting member in direct actuating relation with said pilot-valve member and in direct following relation with said lever at a point spaced from the point of connection to said fulcrum, and a second connecting member in direct actuating relation with said lever at a point intermediate said spaced points and in direct following relation with said main-valve member, said pilot-valve member and said main-valve member being so connected to said lever that for a given adjusted positioning of said fulcrum one direction of lever movement will correspond to an opening movement of said pilot-valve member and to a closing movement of said main-valve member, while the opposite direction of lever movement will correspond to a closing movement of said pilot-valve member and to an opening movement of said main-valve member, so that the magnitude of correcting pilot-valve displacements may exceed the magnitude of corresponding corrected main-valve displacements, whereby relatively sensitive regulation of said valve may be achieved.

2. In a regulating valve, a main-valve including a body having a high-pressure side and a low-pressure side, a main-valve member for controlling the flow of pressure fluid from the high-pressure side to the low-pressure side, a fluid-pressure-actuated member for actuating said valve member and having a high-pressure side and a low-pressure side, means including a pilot-valve member for conducting control-pressure fluid to the high-pressure side of said fluid-pressure actuated member, bleed means for exhausting the high-pressure side of said fluid-pressure-actuated member, *a fulcrum adjustably positionable relatively to said valve body,* selective positive positioning means for positioning said fulcrum in a selected desired position, a lever directly connected to said fulcrum, a first connecting member in direct actuating relation with said pilot-valve member and in direct following relation with said lever at a point spaced from the point of connection to said fulcrum, and a second connecting member in direct actuating relation with said lever at a point intermediate said spaced points and in direct following relation with said main-valve member, said pilot-valve member and said main-valve member being so connected to said lever that for a given adjusted positioning of said fulcrum one direction of lever movement will correspond to an opening movement of said pilot-valve member and to a closing movement of said main-valve member, while the opposite direction of lever movement will correspond to a closing movement of said pilot-valve member and to an opening movement of said main-valve member, so that the magnitude of correcting pilot-valve displacements may exceed the magnitude of corresponding corrected main-valve displacements, whereby relatively sensitive regulation of said valve may be achieved.

PAULSEN SPENCE.

References Cited in the file of this patent or the original patent

UNITED STATES PATENTS

| Number | Name | Date |
|---|---|---|
| 1,231,257 | Herr | June 26, 1917 |
| 1,549,745 | Church | Aug. 18, 1925 |
| 1,725,783 | De Florez | Aug. 27, 1929 |
| 1,961,813 | Caughey | June 5, 1934 |
| 2,185,713 | Spence | June 2, 1940 |
| 2,257,171 | King | Sept. 30, 1941 |
| 2,304,323 | Wiegers | Dec. 8, 1942 |
| 2,431,283 | Spence | Nov. 18, 1947 |